United States Patent
Barker

(10) Patent No.: US 12,245,543 B2
(45) Date of Patent: Mar. 11, 2025

(54) PLANTER HAVING A SEEDING SYSTEM

(71) Applicant: DEERE & COMPANY, Moline, IL (US)

(72) Inventor: Mark E. Barker, Johnston, IA (US)

(73) Assignee: DEERE & COMPANY, Moline, IL (US)

(*) Notice: Subject to any disclaimer, the term of this patent is extended or adjusted under 35 U.S.C. 154(b) by 1146 days.

(21) Appl. No.: 17/078,363

(22) Filed: Oct. 23, 2020

(65) Prior Publication Data

US 2022/0124966 A1 Apr. 28, 2022

(51) Int. Cl.
- *A01C 7/20* (2006.01)
- *A01C 7/04* (2006.01)
- *A01C 15/00* (2006.01)

(52) U.S. Cl.
CPC .............. *A01C 7/206* (2013.01); *A01C 7/042* (2013.01); *A01C 7/201* (2013.01); *A01C 15/006* (2013.01)

(58) Field of Classification Search
CPC ......... A01C 5/064; A01C 7/206; A01C 7/002; A01C 7/042; A01C 7/0443; A01C 7/04
USPC .......................................................... 111/96
See application file for complete search history.

(56) References Cited

U.S. PATENT DOCUMENTS

| | | | |
|---|---|---|---|
| 1,172,191 A * | 2/1916 | Beverly | A01C 5/02 111/96 |
| 3,860,146 A * | 1/1975 | Bauman | A01C 7/044 221/168 |
| 4,444,130 A | 4/1984 | Ray | |
| 4,614,160 A * | 9/1986 | Curlett | A01C 5/02 111/96 |
| 8,863,676 B2 | 10/2014 | Brockmann et al. | |
| 8,942,894 B2 | 1/2015 | Garner et al. | |

(Continued)

FOREIGN PATENT DOCUMENTS

| CN | 105165188 A | 12/2015 |
|---|---|---|
| CN | 108566801 A | 9/2018 |

(Continued)

OTHER PUBLICATIONS

Bosch, "Rotary Capping Machines VRM 6000—7000—8000," <https://docplayer.net/43577517-Rotary-capping-machines-vrm.html> publicly available as early as Aug. 29, 2020 (6 pages).

(Continued)

*Primary Examiner* — Jamie L McGowan
(74) *Attorney, Agent, or Firm* — Michael Best & Friedrich LLP

(57) ABSTRACT

A planter for planting seeds in the ground including a seed meter configured to provide a regulated flow of seeds, and a seed conduit defining a first portion of a flow path configured to transport the seeds from the seed meter towards the ground. The planter also includes a seed guide having an aperture in fluid communication with the seed conduit, the seed guide defining a second portion of the flow path configured to transport the seeds from the seed conduit towards the ground, and a shaft configured to reciprocate with respect to the seed guide through a stroke path towards and away from the ground. The shaft is configured to create a discrete hole in the ground for one of the seeds. A side of the shaft is configured to inhibit the one of the seeds from entering the second portion of the flow path until the shaft retracts past the aperture.

26 Claims, 5 Drawing Sheets

(56) References Cited

U.S. PATENT DOCUMENTS

| | | | |
|---|---|---|---|
| 9,282,693 | B2 | 3/2016 | Anderson |
| 9,596,803 | B2 | 3/2017 | Wendte et al. |
| 9,730,379 | B2 | 8/2017 | Wendte et al. |
| 10,524,410 | B2 | 1/2020 | Schoeny et al. |
| 10,542,666 | B2 | 1/2020 | Connell et al. |
| 10,709,059 | B2 | 7/2020 | Wendte et al. |
| 11,291,172 | B2 | 4/2022 | Beeri et al. |
| 2005/0241553 | A1* | 11/2005 | Dika ................. A01C 7/18 111/170 |
| 2008/0047475 | A1 | 2/2008 | Stehling et al. |
| 2013/0145498 | A1 | 6/2013 | Dickstein et al. |
| 2014/0144930 | A1* | 5/2014 | Tangorra ............. A01C 15/02 222/425 |
| 2014/0165889 | A1 | 6/2014 | Garner et al. |
| 2015/0334914 | A1 | 11/2015 | Zielke |
| 2015/0351315 | A1 | 12/2015 | Wendte et al. |
| 2016/0007523 | A1 | 1/2016 | Rylander |
| 2016/0088786 | A1 | 3/2016 | Kornecki et al. |
| 2016/0234996 | A1 | 8/2016 | Sauder et al. |
| 2017/0172057 | A1 | 6/2017 | Rylander |
| 2017/0202132 | A1 | 7/2017 | Maust et al. |
| 2017/0211087 | A1 | 7/2017 | Wright et al. |
| 2018/0124998 | A1 | 5/2018 | Swanson et al. |
| 2018/0201949 | A1 | 7/2018 | Bogner et al. |
| 2019/0230845 | A1 | 8/2019 | Buchner et al. |
| 2020/0128724 | A1 | 4/2020 | Stoller et al. |
| 2020/0329629 | A1 | 10/2020 | Corelli et al. |
| 2022/0111960 | A1 | 4/2022 | Tran |
| 2022/0167551 | A1 | 6/2022 | Anderson et al. |

FOREIGN PATENT DOCUMENTS

| | | |
|---|---|---|
| CN | 208370186 U | 1/2019 |
| CN | 110859073 A | 3/2020 |
| DE | 102019218191 A1 | 5/2021 |
| EP | 1780126 A1 | 5/2007 |
| GB | 2527818 A | 1/2016 |
| WO | 2015048817 A1 | 4/2015 |

OTHER PUBLICATIONS

Karmelle, "Rotary Capping Machine," <http://karmelle.com/products/capping-machines/rotary-capper/> publicly available as early as Aug. 29, 2020 (2 pages).

Saintyco, "Automatic Capping Machine: The Complete Guide," <https://www.saintytec.com/automatic-capping-machine/> publicly available as early as Aug. 29, 2020 (39 pages).

German Search Report issued in application No. DE102021211505.5 dated May 24, 2022 (10 pages).

Moore, "The History of Dibbling," <https://www.farmcollector.com/looking-back/history-dibbling-zb0z1804zhur > web page publicly available at least as early as Apr. 5, 2018.

Bybee-Finley et al., "Advancing Intercropping Research and Practices in Industrialized Agricultural Landscapes," Agriculture, 2018, vol. 8, pp. 1-24.

Morrone et al., "From Soil Problems to Progress: Advanced Cover Crops Systems Planning," <https://www.canr.msu.edu/foodsystems/uploads/files/advanced-cover-crops-systems-planning.pdf> PowerPoint publicly available at least as early as Aug. 18, 2020 (29 pages).

* cited by examiner

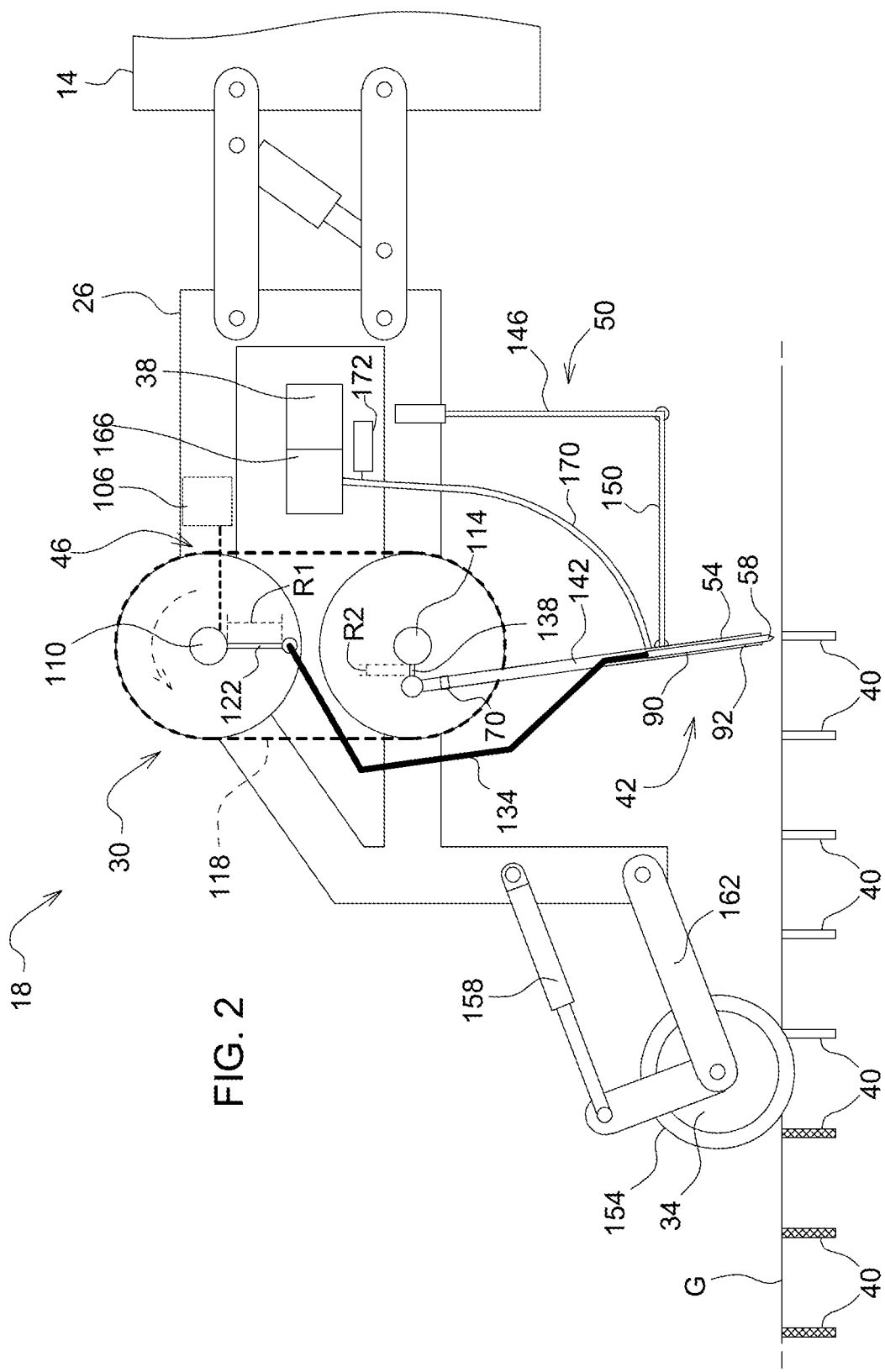

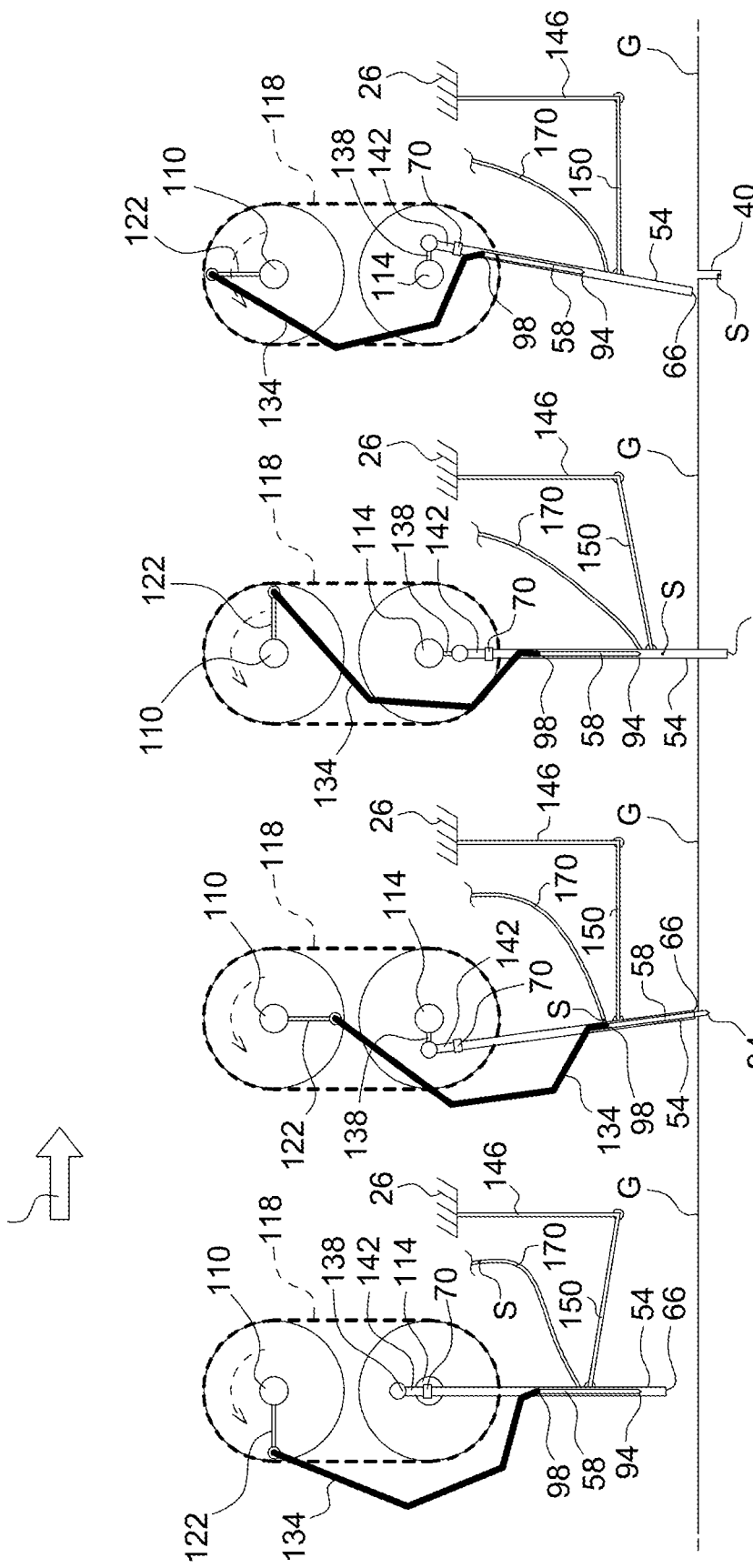

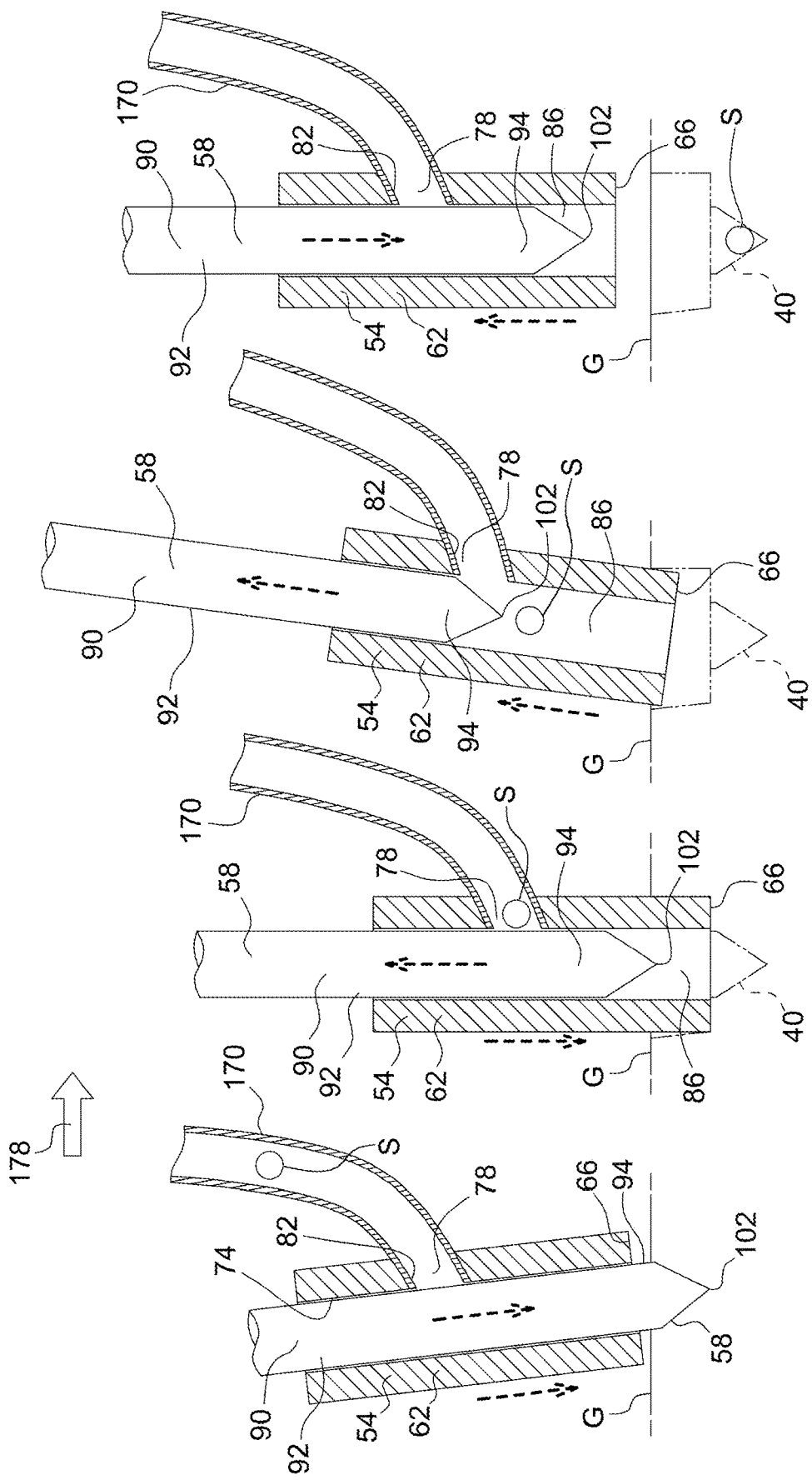

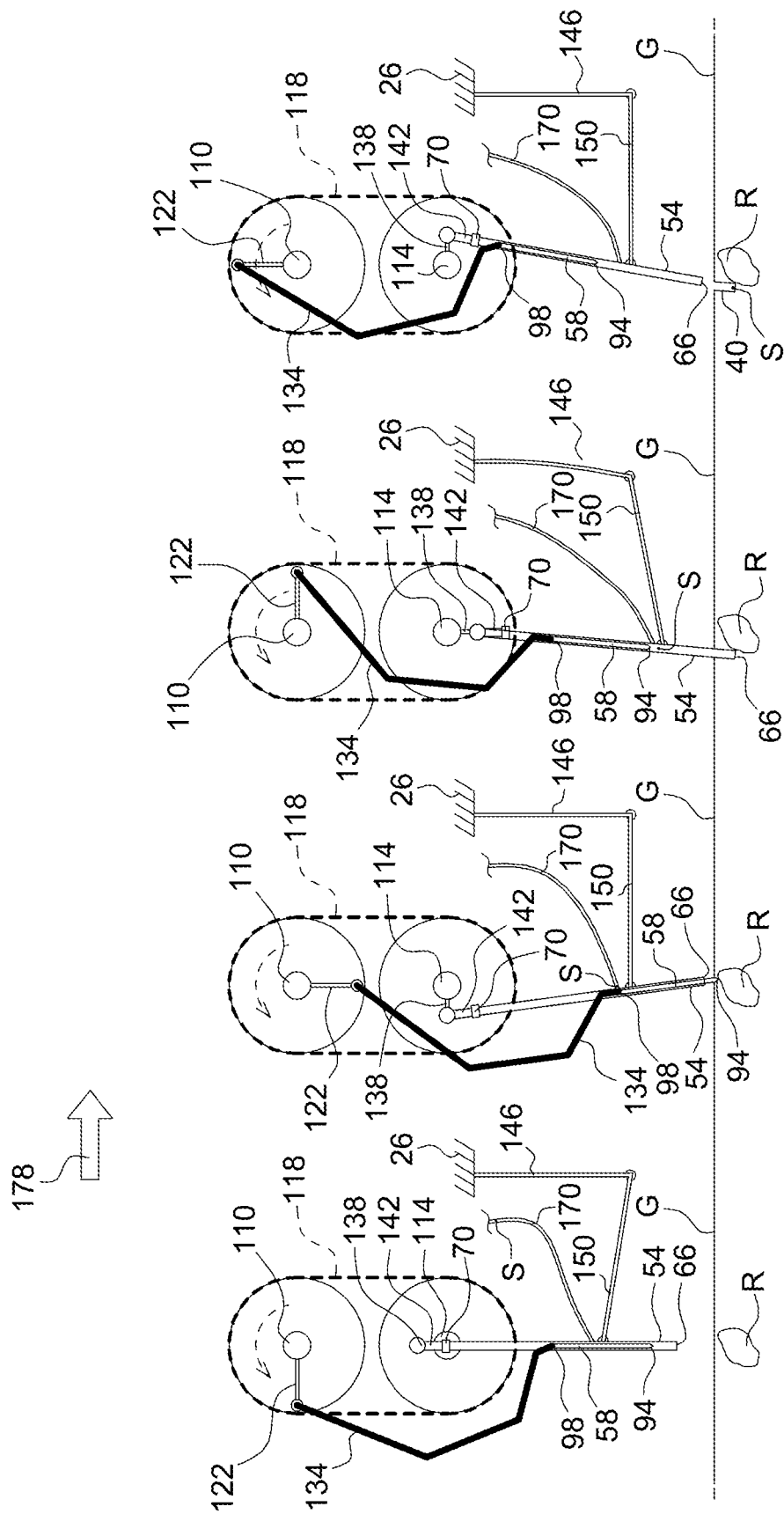

PLANTER HAVING A SEEDING SYSTEM

BACKGROUND

The present disclosure relates to a seeding machine having a seed delivery system for delivering seed from a hopper to the ground.

An agricultural seeding machine such as a row crop planter typically forms a plurality of parallel seed trenches in the soil using a furrow opening disc and places seeds at a desired depth within the trenches. The furrow opening discs require a large amount of force to create the trenches especially when the machine is moving at high speeds and in more compacted soils. Additionally, the structure of the furrow opening discs is such that a large minimum distance is required between the rows.

SUMMARY

In one aspect, the disclosure provides a planter for planting seeds in the ground. The planter includes a seed meter configured to provide a regulated flow of seeds, and a seed conduit defining a first portion of a flow path configured to transport the seeds from the seed meter towards the ground. The planter also includes a seed guide having an aperture in fluid communication with the seed conduit, the seed guide defining a second portion of the flow path configured to transport the seeds from the seed conduit towards the ground. The planter also includes a shaft configured to reciprocate with respect to the seed guide through a stroke path towards and away from the ground, the shaft configured to create a discrete hole in the ground for one of the seeds. A side of the shaft is configured to inhibit the one of the seeds from entering the second portion of the flow path until the shaft retracts past the aperture.

In another aspect, the disclosure provides a planter for planting seeds in the ground. The planter includes a seed meter configured to provide a regulated flow of seeds, and a seed conduit configured to transport the seeds from the seed meter towards the ground. The planter also includes a seeding system having a seed guide having an aperture in fluid communication with the seed conduit, and a shaft configured to reciprocate with respect to the seed guide through a stroke path including extension towards the ground and retraction away from the ground. The shaft is configured to create a discrete hole in the ground for one of the seeds. The seed conduit and the seed guide define a flow path for transporting the one of the seeds towards the discrete hole. The seeding system is configured to retain the one of the seeds outside of the stroke path of the shaft until the shaft retracts a predetermined distance.

In yet another aspect, the disclosure provides a seeding system for planting seeds in the ground. The seeding system includes a frame, and a seed guide having an aperture configured to receive a regulated flow of seeds. The seed guide defines a portion of a flow path for transporting one of the seeds towards the ground. The seed guide is configured to reciprocate with respect to the frame. The seeding system also includes a shaft configured to reciprocate with respect to the frame through a stroke path including extension towards the ground and retraction away from the ground. The shaft is configured to create a discrete hole in the ground for the one of the seeds. The shaft and the seed guide are configured to move with respect to each other.

Other features and aspects of the disclosure will become apparent by consideration of the following detailed description and accompanying drawings.

BRIEF DESCRIPTION OF THE DRAWINGS

FIG. 2 is a side view of one of the plurality of row units of the planter of FIG. 1.

FIGS. 3-6 are schematic side views of a portion of the row unit of FIG. 2 cycling through a series of positions.

FIGS. 7-10 are schematic side views of a planting assembly of the row unit of FIG. 2 cycling through a series of positions.

FIGS. 11-14 are schematic side views of a portion of the row unit of FIG. 2 cycling through a series of positions under alternate conditions.

Figure 1:
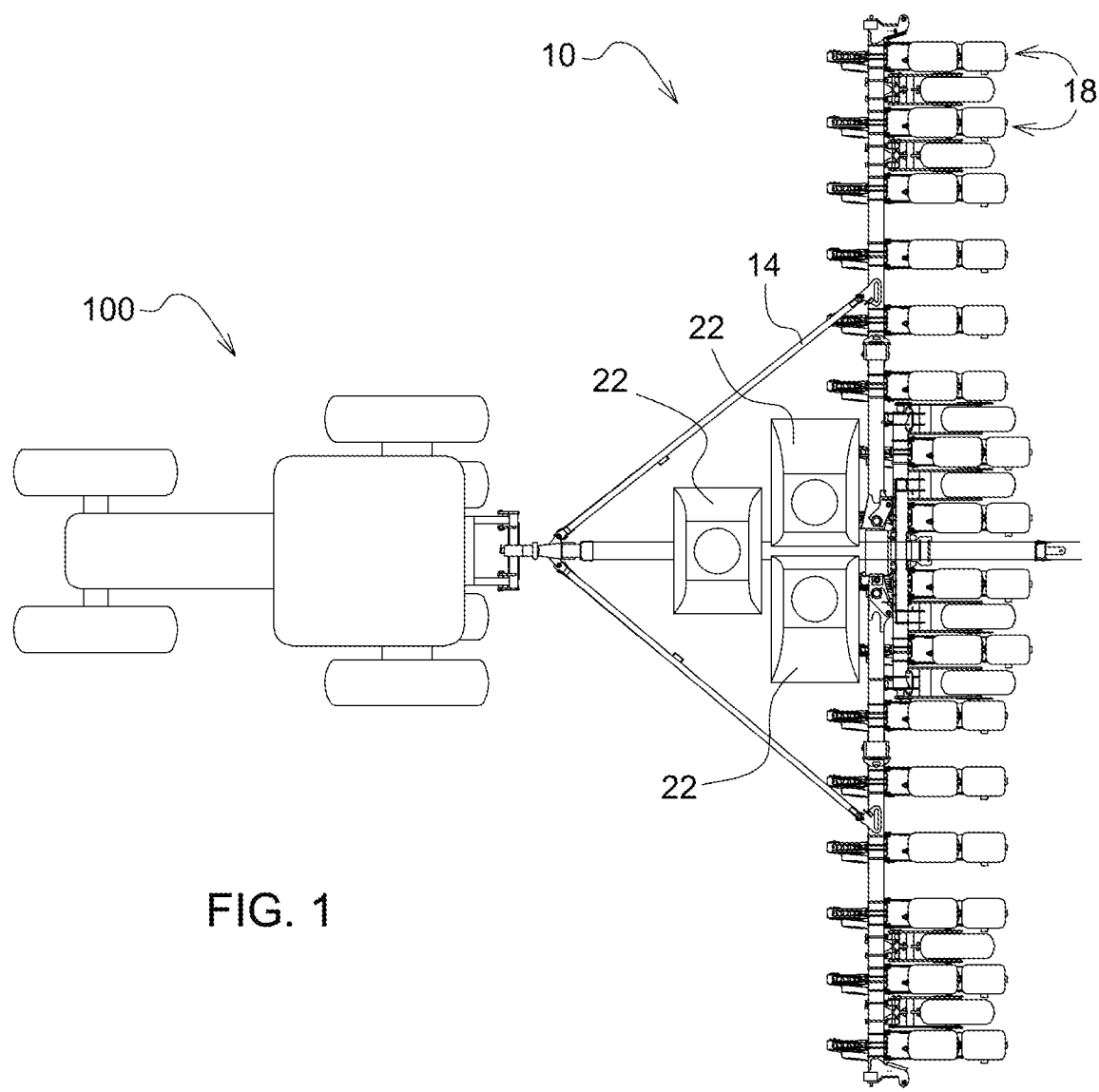
FIG. 1 is a top schematic view of a tractor and a planter having a plurality of row units.

Before any implementations of the disclosure are explained in detail, it is to be understood that the disclosure is not limited in its application to the details of construction and the arrangement of components set forth in the following description or illustrated in the following drawings. The disclosure is capable of supporting other implementations and of being practiced or of being carried out in various ways. Also, it is to be understood that the phraseology and terminology used herein is for the purpose of description and should not be regarded as limiting. The terms "up", "down", and the like may be used herein and should be understood to mean with respect to the ground.

DETAILED DESCRIPTION

With reference to FIG. 1 a planter 10 (which may also be referred to as a seeding machine) is shown. The planter 10 is selectively coupled to a vehicle 100, such as a tractor, to be pulled across a ground G. The planter 10 includes a planter frame 14. A plurality of planting row units 18 are mounted to the planter frame 14. Mounted to the planter frame 14 are one or more hoppers 22 containing seeds to be planted. In some implementations the seeds are all the same. In other implementations, the seeds may be different by hopper 22 and may be planted differently by row or by location within a row.

With reference to FIG. 2, one of the plurality of row units 18 is shown in greater detail and may be referred to herein as "the row unit 18". The plurality of row units 18 may be identical to each other in some implementations but may have some differences in other implementations. The row unit 18 is provided with a central frame member 26 supported on the planter frame 14 by downforce control actuators. The central frame member 26 is configured to support a seeding system 30, a press wheel 34, and a mini hopper 38. The seeding system 30 is operable to create a hole 40 in the ground G for receiving a seed S and to inject the seed into the space. The press wheel 34 then fills in the space with dirt. The seeding system 30 is configured to create a plurality of the holes 40 in series, the holes 40 being discrete from each other. The discrete holes 40 are in contrast with other planters configured to create trenches. The seeding system 30 includes a planting assembly 42, a driving assembly 46, and a support assembly 50.

In the illustrated implementation, the row unit 18 includes a single seeding system 30. However, in some cases it may be desirable to include a second seeding system 30 on some or all of the row units 18. The second seeding system 30 would be mounted to the central frame member 26 in line with the first seeding system 30 (e.g., such that both seeding systems 30 are configured to plant a single row). The second seeding system 30 may include its own driving assembly 46 or may be connected to all or part of the driving assembly 46 of the first seeding system 30. In yet other implementations, each row unit 18 may include three or more seeding systems 30.

As best illustrated in FIGS. 7-10, the planting assembly 42 includes a seed guide 54 and a spike 58. The seed guide 54 is formed as a hollow tube 62 having a guide first end 66 and guide second end 70. The guide first end 66 is selectively disposed adjacent the ground G and the guide second end 70 is connected to the driving assembly 46. The hollow tube 62 includes a tube wall 74 having a seed aperture 78 disposed between the guide first end 66 and the guide second end 70. The seed aperture 78 may include a through-hole 82 disposed in the tube wall 74. The seed guide 54 includes a guide channel 86 extending through the hollow tube 62. The guide channel 86 may be formed as a through-hole defined by the tube wall 74. The spike 58 is formed as a shaft 90 (such that the terms "spike" and "shaft" may be used interchangeably herein) with a sidewall 92 extending between a spike first end 94 and a spike second end 98. The sidewall 92 is elongated and extends parallel to reciprocating movement of the spike 58. The spike first end 94 is tapered to a point 102 such that when inserted into the ground G, the first end creates the hole 40 (which may also be referred to herein as a discrete hole 40), which may be tapered. The hole 40 may be a blind hole (such as a bore or a space or a pocket) in the ground G for receiving one of the seeds S. The spike second end 98 is coupled to the driving assembly 46, as will be described in greater detail below. The spike 58 is slidably disposed within seed guide 54, such that the guide channel 86 receives the shaft 90. The spike 58 and seed guide 54 are both moveable independently with respect to the central frame member 26. The spike 58 is movable along a stroke path with respect to the seed guide 54. The spike 58 and the seed guide 54 are coaxial. In a first position (FIG. 7) along the stroke path, the spike first end 94 extends lower than the guide first end 66. In the first position, the seed aperture 78 is blocked by the spike 58 such that the seed aperture 78 is not in fluid communication with the guide channel 86 of the seed guide 54. In a second position (FIG. 9) along the stroke path, the spike first end 94 is disposed above the seed aperture 78 of the seed guide 54. In the second position, the seed aperture 78 is open (not blocked by the spike 58) such that the seed aperture 78 is in fluid communication with the guide channel 86 of the seed guide 54 (and ultimately in fluid communication with the hole 40 in the ground G). The spike 58 is movable through the stroke path with respect to the seed guide 54 from the first position to the second position and back to the first position, and so on, in a reciprocating fashion as illustrated in FIGS. 7-10. The stroke path may also include, in addition to the reciprocating component towards and away from the ground G, a rocking or tiling component, which will be described in greater detail below. (The terms "tilting" and "rocking" may be used interchangeably herein.) However, in some implementations, the stroke path may include only the reciprocating component.

The seed tube 170 and the seed guide 54 define the flow path that transports the seed S to the hole 40. The seeding system 30 is configured to retain the seed S outside of the stroke path of the spike 58 until the spike 58 retracts a predetermined distance. The predetermined distance may be met when the spike 58 retracts past the seed aperture 78. In some implementations, the predetermined distance may be met by other distances when the spike 58 retracts to other points along the stroke path.

With reference to FIG. 2, the driving assembly 46 includes a motor 106, a first crankshaft 110, and a second crankshaft 114. The second crankshaft 114 is operably connected to the first crankshaft 110 by a timing belt 118. The motor 106 may be directly coupled to the first crankshaft 110 or the second crankshaft 114 with the other driven by the timing belt 118. In some implementations, the first crankshaft 110 and second crankshaft 114 may extend the length of a single row unit 18 and drive one planting assembly 42. In other implementations, the first crankshaft 110 and second crankshaft 114 may extend across multiple row units 18 and drive multiple planting assemblies 42. The first crankshaft 110 is coupled to a first radial link 122 having a first length R1. In the illustrated implementation, the radial link 122 may include an arm mounted on the first crankshaft 110. In other implementations, the radial link 122 may include a post (not shown) mounted at a radius of R1 to a disc (not shown) mounted on the first crankshaft 110. Other linkages are also contemplated. The first radial link 122 is pivotally coupled to a first rigid link 134. The first rigid link 134 may be formed in a shape designed to avoid interference with other components of the row unit 18, as illustrated, or may be formed as a straight bar in other implementations. The first rigid link 134 is rotatably coupled to the spike second end 98 of the planting assembly 42. Similarly, the second crankshaft 114 is coupled to a second radial link 138 having a second length R2 which is pivotally coupled to a second rigid link 142. The second rigid link 142 is coupled to the guide second end 70 of the seed guide 54 of the planting assembly 42 such that the seed guide 54 is aligned coaxially with the second rigid link 142. In some implementations the seed guide 54 may be formed as a part of the second rigid link 142. In other implementations, the driving assembly 46 may have other configurations for driving the spike 58 and the seed guide 54, such as other arrangements of linkages coupled to a rotating shaft or shafts, or linear actuators (such as electric, pneumatic, or hydraulic linear actuators) may be employed. Other suitable mechanisms for driving the spike 58 and seed guide 54 are also contemplated.

The support assembly 50 supports the planting assembly 42 adjacent the ground G. The planting assembly 42 is supported by the support assembly 50 such that the stroke path of the spike 58 is oriented such that the spike 58 reciprocates extending towards and retracting away from the ground G and the sidewall 92 extends parallel to the reciprocation direction of the spike 58. The support assembly 50 includes a flexible arm 146 extending generally vertically below the central frame member 26 and a support arm 150 coupled to a lower end of the flexible arm 146 and extending generally horizontally towards the planting assembly 42. (The term "generally" is used herein to encompass the ability to pivot, move, and/or flex from the main orientation as described below and to indicate that the main orientation need not be exact, just approximate.) The support arm 150 is coupled to the seed guide 54 of the planting assembly 42 and provides support to the planting assembly 42 and driving assembly 46 to inhibit undesired horizontal motion. The support arm 150 supports the seed guide 54 such that the seed guide 54 may reciprocate independently from the spike 58. The horizontal support arm 150 may be spring biased toward an intermediate position but may be able to extend or retract to allow the planting assembly 42 to deflect horizontally. The flexible arm 146 is formed from a material, such as a metal (such as steel, aluminum, or other metal), polymer, or composite (such as fiberglass), that is elastic enough to bend when a force is applied and resilient enough to return to the original form when the force is released. In other implementations, the support assembly 50 may include a single rigid bar coupling the seed guide 54 to the center frame member 26. In other implementations, the seed guide 54 is directly coupled to the central frame member 26 via a pin joint or other pivoting connection. In other implementations, the support assembly 50 may include a rigid vertical support link extending from the central frame member 26 and a horizontal support arm extending between the support link and the seed guide 54. The support assembly 50 may have other suitable configurations in other implementations.

The press wheel 34 includes an outer surface 154 and is configured to apply a downward force to the ground G. The press wheel 34 is supported on the central frame member 26 by a depth control actuator 158. The depth control actuator 158 is actuatable to move the press wheel 34 vertically lower with respect to the central frame member 26 when the depth control actuator 158 is extended or vertically higher with respect to the central frame member 26 when the depth control actuator 158 is retracted. In the illustrated implementation, the press wheel 34 is supported on a linkage 162 that is rotated counterclockwise when the depth control actuator 158 is extended and clockwise when the depth control actuator 158 is retracted. Thus, the press wheel 34 has at least a component of vertical movement in response to actuation of the depth control actuator 158. The rotation of the linkage 162 causes the vertical displacement of the press wheel 34 with respect to the central frame member 26. The depth control actuator 158 may include a gas spring (not shown) controlled by gage wheels (not shown). In other implementations, the depth control actuator 158 may be pneumatically or hydraulically controlled. The press wheel 34 is rotated in response to a friction force between the ground G and the outer surface 154 when the planter 10 is moving. In other implementations, the press wheel 34 may be mounted to the central frame member 26 in other ways.

The central frame member 26 supports the mini hopper 38 adjacent the seeding system 30. The mini hopper 38 is connected to the one or more hoppers 22 and receives seed S therefrom. The central frame member 26 also supports a seed meter 166 such as is known in the art to provide a regulated flow of seeds. The seed meter 166 receives seeds S from the mini hopper 38, separates the seeds S, and supplies metered seeds S to a seed tube 170 (which may also be referred to herein as a seed conduit), one after another in substantially equal sequential intervals. In some implementations, the seed meter 166 may receive seeds S directly from one of the hoppers 22. The seed tube 170 may be pressurized by a pressure source 174 (e.g., a pump or other source of pressurized air) and is in fluid communication with the seed aperture 78 in the seed guide 54 (and thus fluidly connected to the guide channel 86 and to the hole 40 in the ground G). For example, the seed guide 54 may support an end of the seed tube 170 extending at least partially into the seed aperture 78, or the seed tube 170 and the seed guide 54 may be coupled in any other suitable manner, e.g., using a connector between the seed tube 170 and the seed guide 54 in fluid communication with the seed aperture 78. The pressure may be constant or may be timed to match the operation of the driving assembly 46. In other implementations, the seed tube 170 need not be pressurized, e.g., the seed tube 170 may transport the seeds by gravity. In yet other implementations, the seed tube 170 may include a continuous loop belt for transporting the seeds to the seed guide 54. In yet other implementations, the seed tube 170 may include a mechanism to mechanically urge the seeds out of the seed tube 170. The seed tube 170 may form a first portion of a flow path configured to transport the seeds from the seed meter 166 towards the ground G. The seed guide 54 may define a second portion of the flow path, as will be described in greater detail below.

With reference to FIGS. 3-6, in operation, the vehicle 100 is operated to move the planter 10 across the ground G in a first direction 178 and at a planter speed 51. Each seeding system 30 may be started simultaneously or at different times. When started, the motor 106 of the row unit 18 is activated in order to actuate the driving assembly 46. The activation of the motor 106 is separate from the movement of the planter 10. Because of this, a seeding speed S2 of the seeding system 30, as measured by the number of seeds planted per unit time, is independent from the planter speed 51, as measured by the distance traveled per unit time. The activated motor 106 rotates the first crankshaft 110 counterclockwise (as viewed in FIGS. 3-6). As the first crankshaft 110 rotates, the timing belt 118 transfers the motion to the second crankshaft 114, causing the second crankshaft 114 to rotate counterclockwise. The rotation of the first crankshaft 110 and second crankshaft 114 cause the driving assembly 46 to cycle through a plurality of stages. At the start of the cycle, shown in FIG. 3, the first radial link 122 is disposed pointing to the left of the first crankshaft 110 and the second radial link 138 is disposed pointing upward of the second crankshaft 114. The second rigid link 142 extends generally vertically from the second radial link 138 to the seed guide 54, which also is oriented generally vertically. The spike 58 is pivotally connected to the first rigid link 134 such that it follows the orientation of the seed guide 54. The spike 58 is disposed between the first position and the second position relative to the seed guide 54. Both the spike first end 94 and the guide first end 66 are disposed above the ground G. As shown in FIG. 4, the movement of the first crankshaft 110 and second crankshaft 114 rotates the first radial link 122 and second radial link 138, respectively. The first radial link 122 is disposed downward of the first crankshaft 110, moving the first rigid link 134 and the spike 58 down as well. The second radial link 138 is disposed left of the second crankshaft 114, moving the second rigid link 142 and seed guide 54 down and tilting each toward the left (as illustrated in FIG. 4). The spike 58 is now in the first position relative to the seed guide 54. The spike 58 is in the ground G (meaning engaged with and displacing soil to create the hole 40) and the seed guide 54 is adjacent the ground G. The cycle continues to FIG. 5 where the first radial link 122 points right and the second radial link 138 points down. The seed guide 54 is oriented generally vertically, and the spike 58 is disposed between the first and second positions. The seed guide 54 is now in the ground G, further displacing soil to create the hole 40. In other words, the seed guide 54 is configured to penetrate the ground G to create a portion of the hole 40. The rotation continues to the stage shown in FIG. 6 and the first radial link 122 points upward and the second radial link 138 point left. The seed guide 54 and spike 58 are tilted to the right and the spike 58 is in the second position. The seed guide 54 is adjacent the ground G. The cycle then continues with the first radial link 122 returning to the left of the first crankshaft 110 and the second radial link 138 returning to the top of the second crankshaft 114 as shown in FIG. 3. The resultant motion of the planting assembly 42 in response to the driving assembly 46 is that the seed guide 54 and the spike 58 reciprocate independently with respect to each other and with respect to the central frame member 26. In other words, the seed guide 54 is configured to reciprocate asynchronously with respect to the spike 58. In some portions of the resultant motion, the spike 58 retracts while the seed guide 54 extends (FIG. 8) and in other portions of the resultant motion, the spike 58 extends while the seed guide 54 retracts (FIG. 10).

The movement of the planting assembly 42 is shown in more detail in FIGS. 7-10. As the planter 10 travels along the row in the first direction 178 and the driving assembly 46 operates the spike 58 and seed guide 54 both move toward the ground G, as shown in FIG. 7. As the spike 58 pierces the ground G, the tapered point 102 displaces the soil with minimal force. The spike 58 is tilted away from the first direction 178 as it pierces the ground G, meaning the spike first end 94 is further in the first direction 178 than the spike second end 98. At this time a seed S from the mini hopper 38 has been supplied to the seed tube 170 by the seed meter 166 and travels down toward the planting assembly 42. As shown in FIG. 8, once the spike 58 has reached a maximum extension, it begins to move back toward the central frame member 26, leaving the hole 40 in the ground G. The maximum extension is determined by the length R1 of the first radial link 122. A larger length R1 creates a maximum extension that extends deeper into the ground G. The spike 58 is still tilted away from the first direction 178 as it travels out of the ground G. The seed guide 54 continues to move downward toward a maximum extension and into the ground G, displacing the soil further, still with minimal force required. The maximum extension of the seed guide 54 is determined by the length R2 of the second radial link 138, in a similar manner to the maximum extension of the spike 58. In other words, the maximum extension of the seed guide 54 defines an extended position for engaging the ground G. At this point, the seed S is disposed adjacent the seed aperture 78 and is inhibited from entering the guide channel 86 by the sidewall 92 of the spike 58, the sidewall 92 acting as a barrier between the seed S and the hole 40. As shown in FIG. 9, the spike 58 retracts, e.g., follows the stroke path away from the ground G. As the spike 58 retracts past the seed aperture 78, gravity and the pressure from the seed tube 170 pushes the seed S into the guide channel 86 of the seed guide 54. In some implementations, gravity may push the seed S into the guide channel 86 without the use of pressure. The spike 58 and the seed guide 54 are configured such that the seed S is blown past the spike 58 upon retraction of the spike 58 past the seed aperture 78. The seed aperture 78 is disposed outside of the stroke path of the spike 58 as the seed aperture 78 is disposed in the tube wall 74 of the seed guide 54. In other words, the spike 58 does not enter the seed aperture 78. The point 102 of the spike 58 is configured to not contact the seed S during shaft extension. However, the sidewall 92 may contact the seed S to block the seed S, as described above, in some instances. The spike 58 is configured to not push the seed S into the ground G. In some implementations, the spike 58 does not include a channel for transporting the seed S through the spike 58; rather, the seed S is transported past the spike 58. Damage to the seed S in inhibited by reducing contact between the spike 58 and the seed S.

As shown in FIG. 10, the seed guide 54 has begun to move back toward the central frame member 26, tilted toward the first direction 178, having widened the hole 40, however the guide first end 66 is still in the ground G. The seed S, therefore, has followed the guide channel 86 down into the hole 40. Misplacement and damage of the seed S is inhibited by injecting the seed S when the guide first end 66 is still in the ground G. As shown in FIG. 10, as the seed guide 54 moves toward the central frame member 26, away from the ground G, the spike 58 begins to move back toward the ground G, and the planting assembly 42 begins to tilt away from the first direction 178 once more. Because of the tilting of the planting assembly 42, the resultant hole 40 is minimally elongated in the first direction 178.

The process repeats to create further holes 40 in series in the first direction 178. The planting assembly 30 is configured to create one hole 40 on each stroke.

The press wheel 34 (FIG. 2) follows the planting unit and applies a force that redistributes the soil, filling in the holes 40. The operation leaves a series of loose soil spots, in contrast to the loose trenches created by typical furrow disks. The press wheel 34 may be supported at different distances from the central frame member 26 in order to create different planting heights. The position of the press wheel 34 may be adjusted by actuating the depth control actuator 158 through the associated gage wheels. Extending the depth control actuator 158 lowers the press wheel 34 toward the ground G, creating a shallower planting depth, and retracting the depth control actuator 158 raises the press wheel 34 away from the ground G, creating a deeper planting depth.

In certain cases, the ground G is not uniform. For example, there may be rocks or hard spots embedded in the ground G. As the spike 58 punches into the ground G, it may run into the hard spot. To inhibit damage to the seeding system 30 and to reduce disruptions to the operation, the force of the rock R is deflected through the flexible arm 146. As illustrated in FIGS. 11-14, when the spike 58 hits a hard spot, the flexible arm 146 may bend allowing the downward force provided by the driving assembly 46 to continue and the planting assembly 42 to move. In the illustrated implementation the flexible arm 146 bends such that a lower end of the flexible arm 146 moves away from the first direction 178 and the planting assembly 42 is horizontally displaced away from the first direction 178. However, the flexible arm 146 and the planting assembly 42 may also deflect toward the first direction 178. The direction of deflection of the flexible arm 146 and the planting assembly 42 may be based on the geometry of the hard spot and the reaction forces within the planting assembly 42.

The planter design as described above requires less down force than typical furrowing discs. Because the planter 10 has to support less down force, the central frame member 26 can be made of lighter materials. The seeding system 30 design also makes it easy to synchronize the seeding across the rows, making it easy to create a grid planted field. The holes created by the seeding system 30 are relatively small and therefore create less loose soil which makes erosion and subsequent seed loss less likely. Additionally, the driving assembly 46 is driven independently of the motion of the planter 10. This allows seeding speed S2 to be varied independently of the planter speed 51, allowing for more precise seeding. The small profile of the seeding system 30 and the holes created by the seeding system 30 allows for less distance between row units 18 and therefore less distance between rows. Thus, more rows can be planted.

Various features of the disclosure are set forth in the following claims.

What is claimed is:

1. A planter for planting seeds in the ground, the planter comprising:
   a seed meter configured to provide a regulated flow of seeds;

a seed conduit defining a first portion of a flow path configured to transport the seeds from the seed meter towards the ground;

a seed guide having an aperture in fluid communication with the seed conduit, the seed guide defining a second portion of the flow path configured to transport the seeds from the seed conduit towards the ground; and a shaft configured to reciprocate with respect to the seed guide through a stroke path towards and away from the ground, the shaft configured to create a discrete hole in the ground for one of the seeds, wherein the shaft is further configured such that during operation a sidewall of the shaft inhibits the one of the seeds from entering the second portion of the flow path until the shaft retracts past the aperture, and wherein the seed guide is configured to reciprocate independently from the shaft.

2. The planter of claim 1, wherein the aperture is disposed outside of a path of the stroke such that the shaft does not enter the aperture.

3. The planter of claim 1, wherein the sidewall of the shaft extends parallel to a reciprocation direction of the shaft, wherein the sidewall of the shaft is configured to block the aperture in a portion of the stroke such that the seed conduit is not in fluid communication with the discrete hole, and wherein the aperture is configured to be open upon retraction of the shaft past the aperture such that the seed conduit is in fluid communication with the discrete hole.

4. The planter of claim 1, wherein the seed guide includes a tube wall defining a through hole for receiving the shaft, wherein the aperture is disposed in the tube wall.

5. The planter of claim 1, wherein the seed guide is configured to penetrate the ground to create a portion of the discrete hole.

6. The planter of claim 1, wherein the seed guide is configured to reciprocate asynchronously with respect to the shaft.

7. The planter of claim 1, further comprising an air pressure source configured to blow the seeds through the aperture.

8. The planter of claim 7, wherein the shaft and the seed guide are configured such that the one of the seeds is blown past the shaft upon retraction of the shaft past the aperture.

9. A planter for planting seeds in the ground, the planter comprising:

a seed meter configured to provide a regulated flow of seeds;

a seed conduit configured to transport the seeds from the seed meter towards the ground; and a seeding system including
a seed guide having an aperture in fluid communication with the seed conduit, and
a shaft configured to reciprocate with respect to the seed guide through a stroke path including extension towards the ground and retraction away from the ground, the shaft includes a first end configured to create a discrete hole in the ground for one of the seeds, wherein the shaft is configured such that during operation the first end does not contact the one of the seeds, wherein the seed conduit and the seed guide define a flow path for transporting the one of the seeds towards the discrete hole, wherein the seeding system is configured to retain the one of the seeds outside of the stroke path of the shaft until the shaft retracts a predetermined distance, and wherein the seed guide is configured to reciprocate independently from the shaft.

10. The planter of claim 9, wherein a sidewall of the shaft retains the seed outside of the stroke path of the shaft until the shaft retracts past the aperture.

11. The planter of claim 9, wherein the shaft does not contact the seed during shaft extension.

12. The planter of claim 9, wherein the shaft is configured to block the flow path in a first portion of the stroke such that the shaft acts as a barrier between the one of the seeds and the discrete hole, and wherein the shaft is configured to be retractable past the aperture to remove the barrier in a second portion of the stroke.

13. The planter of claim 9, wherein the seeding system is configured to transport the one of the seeds to the discrete hole while at least a portion of the seed guide is in the ground.

14. A seeding system for planting seeds in the ground, the seeding system comprising:

a frame;

a seed guide having an aperture configured to receive a regulated flow of seeds, the seed guide defining a portion of a flow path for transporting one of the seeds towards the ground, the seed guide configured to reciprocate with respect to the frame; and a shaft configured to reciprocate with respect to the frame through a stroke path including extension towards the ground and retraction away from the ground, the shaft configured to create a discrete hole in the ground for the one of the seeds, wherein the shaft and the seed guide are configured to move with respect to each other, wherein the seed guide and the shaft are configured to reciprocate asynchronously with respect to the frame.

15. The seeding system of claim 14, wherein the seed guide is configured to transport the one of the seeds to the discrete hole in an extended position for engaging the ground.

16. The seeding system of claim 14, wherein the shaft is configured to not extend into the aperture.

17. The seeding system of claim 14, wherein extension of the shaft blocks the flow path to inhibit movement of the seed through the aperture, and wherein the seed guide is configured to allow passage of the one of the seeds through the aperture by retraction of the shaft past the aperture.

18. A planter for planting seeds in the ground, the planter comprising:

a seed meter configured to provide a regulated flow of seeds;

a seed conduit defining a first portion of a flow path configured to transport the seeds from the seed meter towards the ground;

a seed guide having an aperture in fluid communication with the seed conduit, the seed guide defining a second portion of the flow path configured to transport the seeds from the seed conduit towards the ground; and a shaft configured to reciprocate with respect to the seed guide through a stroke path towards and away from the ground, the shaft configured to create a discrete hole in the ground for one of the seeds, wherein the shaft is further configured such that during operation a sidewall of the shaft inhibits the one of the seeds from entering the second portion of the flow path until the shaft retracts past the aperture, and wherein the seed guide is configured to reciprocate asynchronously with respect to the shaft.

19. The planter of claim 18, wherein the aperture is disposed outside of a path of the stroke such that the shaft does not enter the aperture.

20. The planter of claim 18, wherein the sidewall of the shaft extends parallel to a reciprocation direction of the shaft, wherein the sidewall of the shaft is configured to block the aperture in a portion of the stroke such that the seed conduit is not in fluid communication with the discrete hole, and wherein the aperture is configured to be open upon retraction of the shaft past the aperture such that the seed conduit is in fluid communication with the discrete hole.

21. The planter of claim 18, wherein the seed guide includes a tube wall defining a through hole for receiving the shaft, wherein the aperture is disposed in the tube wall.

22. The planter of claim 18, wherein the seed guide is configured to penetrate the ground to create a portion of the discrete hole.

23. A planter for planting seeds in the ground, the planter comprising:
- a seed meter configured to provide a regulated flow of seeds;
- a seed conduit configured to transport the seeds from the seed meter towards the ground; and
- a seeding system including
  - a seed guide having an aperture in fluid communication with the seed conduit, and
  - a shaft configured to reciprocate with respect to the seed guide through a stroke path including extension towards the ground and retraction away from the ground, the shaft includes a first end configured to create a discrete hole in the ground for one of the seeds, wherein the shaft is configured such that during operation the first end does not contact the one of the seeds, wherein the seed conduit and the seed guide define a flow path for transporting the one of the seeds towards the discrete hole, wherein the seeding system is configured to retain the one of the seeds outside of the stroke path of the shaft until the shaft retracts a predetermined distance, and wherein the seeding system is configured to transport the one of the seeds to the discrete hole while at least a portion of the seed guide is in the ground.

24. The planter of claim 23, wherein a sidewall of the shaft retains the seed outside of the stroke path of the shaft until the shaft retracts past the aperture.

25. The planter of claim 23, wherein the shaft does not contact the seed during shaft extension.

26. The planter of claim 23, wherein the shaft is configured to block the flow path in a first portion of the stroke such that the shaft acts as a barrier between the one of the seeds and the discrete hole, and wherein the shaft is configured to be retractable past the aperture to remove the barrier in a second portion of the stroke.

* * * * *